Nov. -, ----  3,283,231
SERVO-MECHANISM FOR OPTICAL SYSTEMS
Filed Sept. 9, 1963
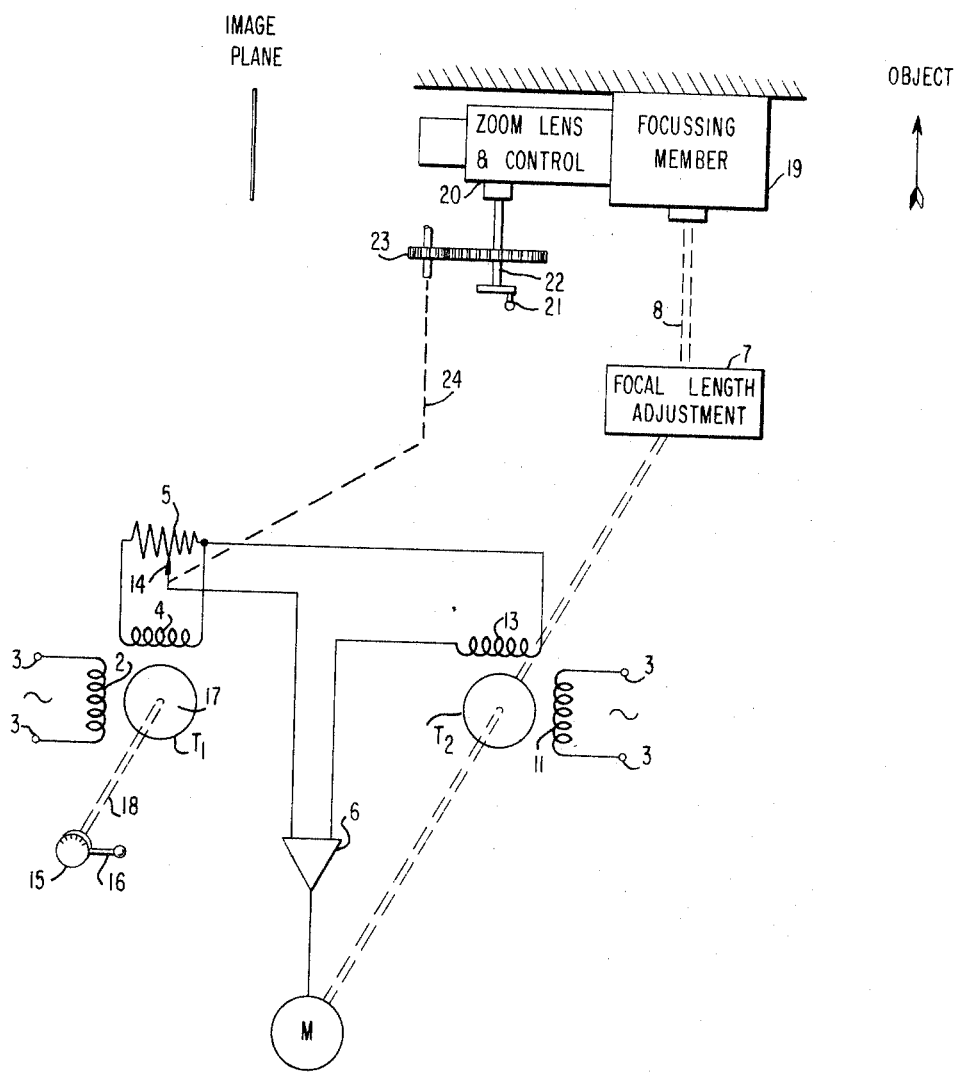
INVENTOR.
JOSEPH H. ASKEW
BY
ATTORNEYS

United States Patent Office

3,283,231
Patented Nov. 1, 1966

3,283,231
SERVO-MECHANISM FOR OPTICAL SYSTEMS
Joseph H. Askew, London, England, assignor to Evershed & Vignoles Limited, London, England, a British company
Filed Sept. 9, 1963, Ser. No. 307,474
Claims priority, application Great Britain, Sept. 12, 1962, 34,855/62
3 Claims. (Cl. 318—30)

This invention relates to "zoom" lenses for use in film and television cameras, that is to say lenses of which the focal length may be adjusted so as to change the view from long-shot to closeup, for example, while at the same time maintaining the object in sharp focus. Such a lens has two main controls, namely the normal manual focussing control and the focal length or zoom control. A major difficulty inherent in zoom lenses is the wide variation of sensitivity in the focussing control with adjustment of the zoom control. A control adjusted to give sensitive and rapid focussing at closeup will become soft, and require considerably greater adjustment for a long-shot. This inevitably adds to the complications of operating a camera fitted with such a lens.

With zoom lenses having a wide range of focal length, for example, from 5:1 to 10:1 it is becoming the practice to operate both main controls by small electrical servo systems and the invention is particularly concerned with lenses controlled in this way. The invention is based on the fact that the focussing sensitivity varies inversely with the square of the focal length of the zoom lens and this fact is made use of in compensating for the variation in sensitivity referred to above.

According to the present invention a focussing mechanism for a lens is driven from an electrical servomotor controlled by the output of an amplifier, the input to which includes a negative feed-back signal proportional to the speed of the servomotor, and a control signal derived from a manually operable electrical transmitter by way of a potentiometer having a characteristic which conforms substantially to a square law over at least the greater part of its range and adjusted by the zoom control of the lens. The control signal to the amplifier is regulated by the potentiometer in accordance with the position of the zoom control in such a way as to maintain the sensitivity of the focussing control substantially constant over the whole range of the zoom control. In other words the control signal is such that the focussing movement is greater for low focal lengths than for high focal lengths for a similar movement of the manually operable electrical transmitter. The "feel" of the manual focussing control is thus rendered substantially constant with a consequent improvement in ease of operation.

By means of the arrangement just described the servomotor is controlled to run at a speed which is accurately proportional to the modified signal from the transmitter and the number of revolutions turned by the motor thus represents the integral of this signal. In other words the system operates as a positional servo and the modification of the hand-generated signal by the square law potentiometer provides the necessary modification to the focussing control to make the "feel" constant, with a consequent improvement in the ease of operation.

It will be appreciated that the servomotor requires an input sufficient to produce a torque high enough to overcome the frictional forces of the focussing mechanism, and that if this input is not sufficient then the lens will not be moved. The control signal applied to the amplifier must therefore allow a minimum output from the amplifier equal to the minimum required by the servomotor. If the potentiometer adjusted by the zoom control conformed to the square law over the whole of its length, it is possible that in some circumstances, particularly for settings at the low-sensitivity end of the potentiometer the control signal might reach a critical value and not allow this minimum amplifier output. In such cases therefore the square-law characteristic is not continued over this part of the potentiometer and the control signal is kept some way from the critical value. This inevitably results in some variation of feel of the manual focussing control but it will be evident that this will only be over a very small part of the range and that it will not be particularly marked. The advantages given by the invention will still be apparent over the greater part of the zoom range.

Preferably the negative feed-back signal is derived from a tachogenerator driven from the servomotor. Other ways of deriving this are also possible, and for example the known method could be used in which the signal is derived from the differentiated output of a potentiometer energised from a D.C. source coupled to the servomotor load, the slider of the potentiometer being driven by the motor driving the load. Movement of the slider will cause a variation of the voltage appearing across the slider and one end of the potentiometer, so that this voltage will give an indication of the load position. The rate of change of this voltage is a measure of the speed of the servomotor, so that if the output voltage signal is differentiated this will give a feed-back signal proportional to the speed of the servomotor.

A system in accordance with the invention will now be described with reference to the accompanying drawing which is a schematic diagram.

The manual focussing control for the lens is represented by a tachogenerator $T_1$ which is driven by the operator's hand through a mechanical arrangement coupling a focus control 15 having an operating handle 16 to the rotor 17 of the tachogenerator $T_1$ by a shaft 18. The tachogenerator $T_1$ is an induction tachometer that produces a voltage in an output winding 4 only when the rotor 17 is moved where the induced voltage is proportional to the speed of the rotor 17. The tachogenerator used in the embodiment being described is a standard item of commerce produced by Evershed and Vignoles Ltd. of London, England, the assignees of the present invention, under their catalog designation FC72. The excitation winding is illustrated diagrammatically as 2 and is supplied from a source of alternating current 3. The output from winding 4 is connected by way of a square law potentiometer 5 to provide a control signal to the input of a high-gain servo amplifier 6 whose output controls a servomotor M. The motor M drives both a second tachogenerator $T_2$ and also, via a gear box 7 and a shaft 8, a focussing member which has been indicated broadly as element 19 of the lens. The focussing member and the lens controlled thereby have not been shown in detail in the drawing in that they are devices well known in the art.

The excitation winding of the tachogenerator $T_2$ is shown as element 11, and is supplied from the same source of alternating current 3 as the tachogenerator 1. Tachogenerator $T_2$ is of the same type as tachogenerator $T_1$. Tachogenerator $T_2$ provides a negative feed-back signal proportioned to the speed of the motor M which opposes the control signal to the amplifier 6 and its armature 13 is thus connected in series with the potentiometer 5 in the input circuit of the amplifier 6.

It is well known in the art to adjust the position of a zoom lens either through motor operated means or manual means. Typical arrangements are taught in U.S. Patent Numbers 2,532,685 and 2,782,683. In the present invention the potentiometer 5 is adjusted by a zoom control which has been broadly shown as element 20 of the lens. The zoom control 20 comprises an operating handle 21 mounted on a shaft 22 where the shaft 22 is connected to drive a conventional movable assembly for the zoom lens. A slider 14 of the potentiometer may be caused to move directly with movement of the zoom control through any conventional arrangement such as a gear 23 mounted on the shaft 22 to turn with it and to operate the slider 14 through an output shaft 24. It will, of course, be understood by those skilled in the art that the gear 23 correlates movement of the zoom lens and the slider 14. In this manner movement of the zoom control automatically causes movement of the slider 14. This adjustment of the potentiometer and thus the signal from the tachogenerator $T_1$ is in accordance with the square law of the potentiometer so that the focussing control has a substantially constant sensitivity over the whole range of the zoom control. As described above the system operates as a positional servo so that for any particular number of turns applied manually to the tachogenerator $T_1$ by the operator a corresponding number of turns (modified in accordance with the square law of the potentiometer 5) is applied to the focussing mechanism by way of the shaft 8.

The system just described operates with alternating current but direct current components could be used if required or alternatively the servo amplifier described could be replaced by an A.C. amplifier with a D.C./A.C. modulator input stage and an A.C. motor.

I claim:
1. A focussing control system for a zoom lens comprising:
   a focussing mechanism for said lens;
   a servo motor operatively connected to the said focussing mechanism;
   an amplifier connected to said servo motor for controlling the operation thereof;
   feedback means connected to said servo motor and to said amplifier for applying negative feedback signals representative of the speed of said servo motor to the input of said amplifier;
   a zoom control for said lens;
   a potentiometer operatively connected to the input of said amplifier and having a slider mechanically coupled to said zoom control, said potentiometer having a square law characteristic over the greater portion of its range;
   and a manually operable electric transmitter connected to said potentiometer for providing focus control.
2. A system according to claim 1, in which said manually operable transmitter is a tachogenerator.
3. A system according to claim 1, in which said feedback means is a tachogenerator driven by said servomotor.

References Cited by the Examiner
UNITED STATES PATENTS

| | | | |
|---|---|---|---|
| 2,532,685 | 12/1950 | Walker | 88—57 |
| 2,720,817 | 10/1955 | Mills | 88—57 |
| 2,782,683 | 2/1957 | Walker | 88—57 |
| 3,093,784 | 6/1963 | Minter | 318—327 |

ORIS L. RADER, *Primary Examiner.*

JOHN F. COUCH, *Examiner.*

B. DOBECK, *Assistant Examiner.*